Feb. 17, 1942.                J. E. WALL                2,273,605
                                VALVE
                         Filed Aug. 31, 1940           4 Sheets-Sheet 1
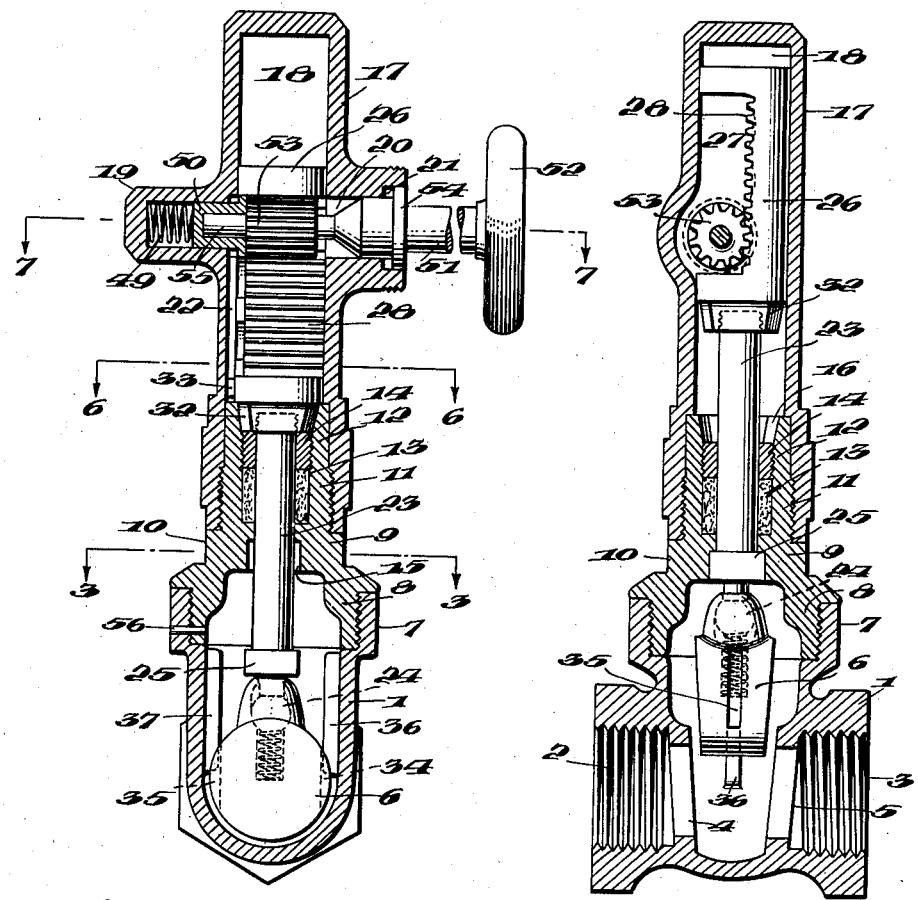
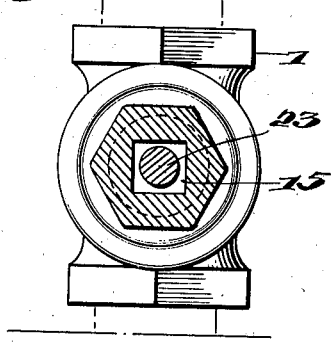
Inventor:-
Joseph E. Wall,
By Smith, Michael & Gardiner,
            Attorneys.

Feb. 17, 1942.　　　J. E. WALL　　　2,273,605
VALVE
Filed Aug. 31, 1940　　4 Sheets-Sheet 2
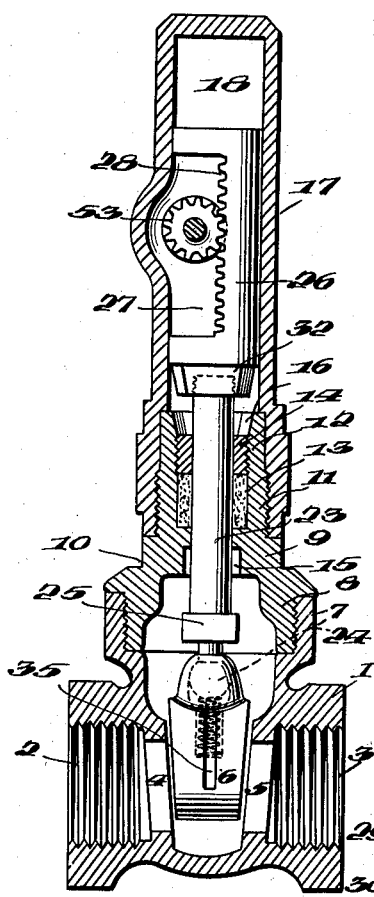
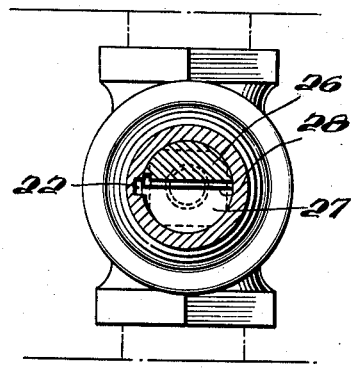
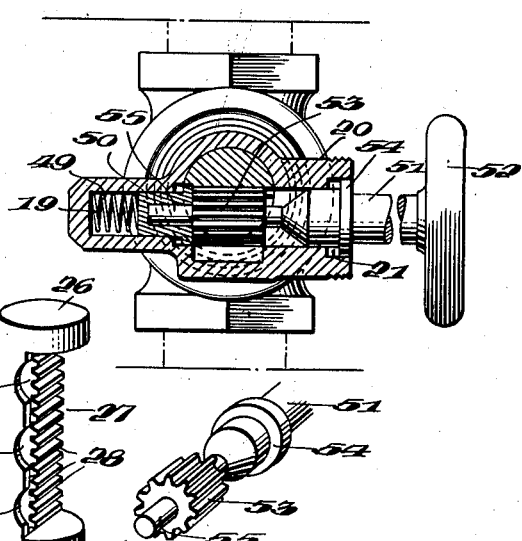
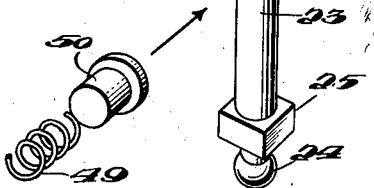
Inventor:-
Joseph E. Wall,
By Smith, Michael & Gardiner,
Attorneys.

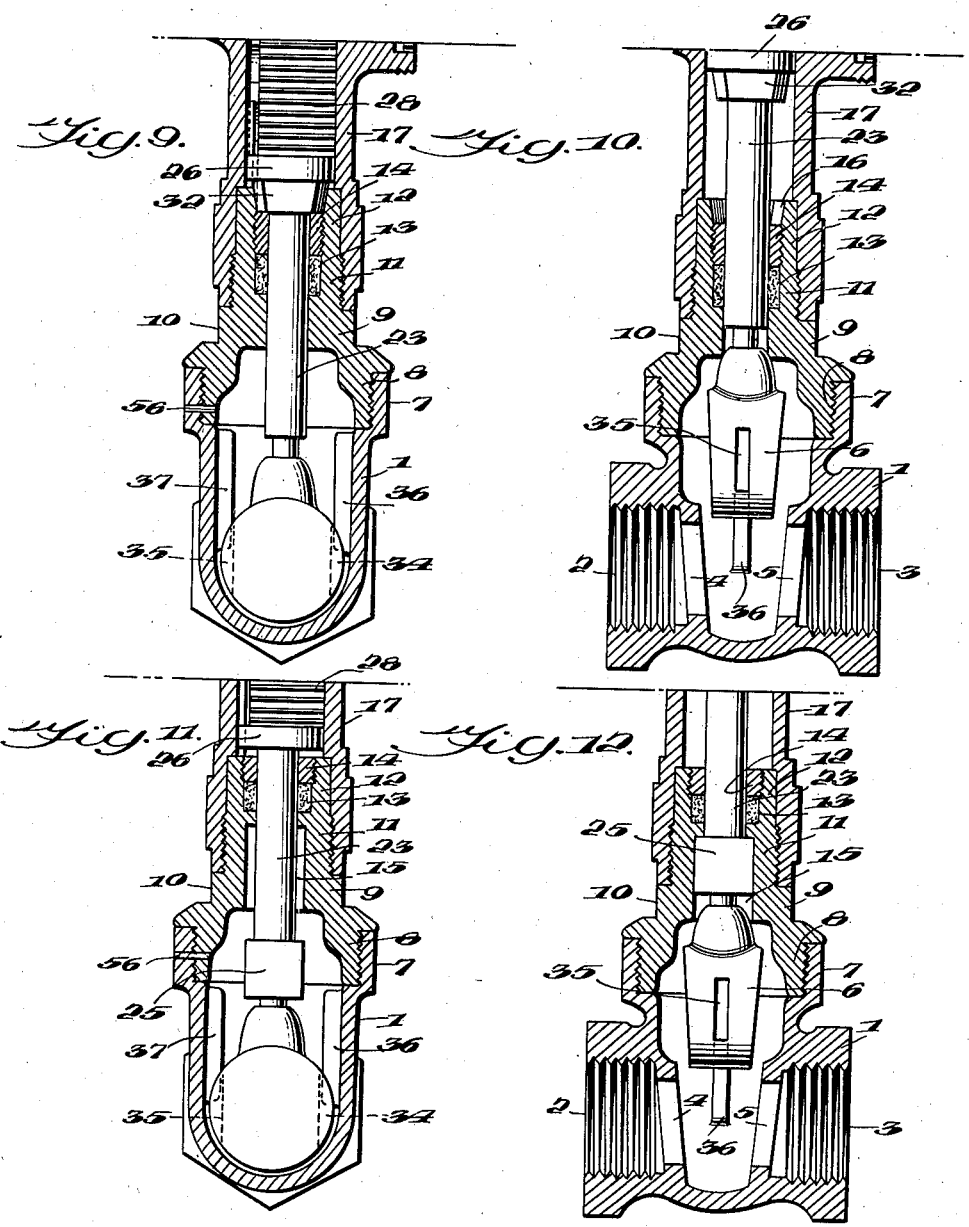

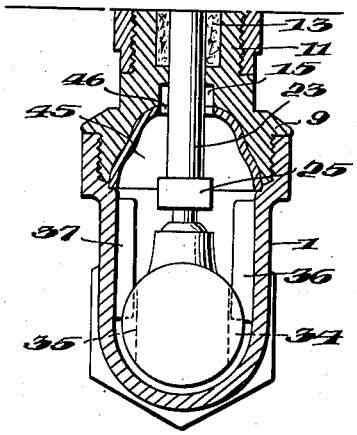

Patented Feb. 17, 1942

2,273,605

UNITED STATES PATENT OFFICE 2,273,605

VALVE

Joseph E. Wall, St. Louis, Mo.

Application August 31, 1940, Serial No. 355,097

19 Claims. (Cl. 251—156)

The present invention is a continuation-in-part of my application Serial Number 151,007 filed June 29, 1937, now Patent No. 2,213,264 dated Sept. 3, 1940.

The subject-matter of the present invention relates to valves, and has particular reference to an improved valve in which an interlock is provided between the valve stem and a composite or sectional valve casing and/or between the valve stem and valve disc, whereby, when the interlock is in engagement, the valve casing sections are locked in assembled position when the valve stem and valve disc are in open and/or closed position and wherein said valve casing sections can be disassembled or separated only when the interlock is disengaged and when the valve stem and valve disc occupy positions intermediate their open and closed positions.

It is an object of my present invention to provide a composite or sectional valve casing, the sections of which enclose the valve stem and valve disc and the valve operating mechanism or a portion thereof, and in which an interlock is provided between the valve stem and casing sections and/or between the valve stem and valve disc, which interlock, when in engagement, functions to prevent separation of the valve casing sections when the valve stem and valve disc are in open and/or closed positions.

It is an object of my present invention to provide a valve casing composed of a plurality of sections adapted to be secured in assembled relation to constitute a casing for enclosing the valve mechanism and the operating mechanism therefor, and wherein an interlock is provided between the valve mechanism and the several component sections of the valve casing and/or between the valve stem and valve disc, the arrangement being such that the sections of the casing cannot be disassembled or separated when the valve is in open and/or closed position, but which sections can be readily disassembled or separated when the valve is moved to a position intermediate its open and closed positions.

It is an object of my invention to provide a valve casing composed of a plurality of sections adapted to be screwed together to constitute a composite casing for enclosing the valve stem and valve disc and the operating mechanism therefor, and in which one of said sections is provided with means for preventing rotation of the valve disc with respect to said section and wherein a section of the composite casing is provided with or includes therein a non-circular recess or recesses adapted to receive therein a non-circular portion or portions carried by the valve stem, the arrangement being such that when one of the non-circular portions on the valve stem is in engagement with one of the non-circular recesses in the valve casing, it is impossible to unscrew or disassemble the sections of the composite valve casing, which sections can only be unscrewed or separated when the valve stem occupies a position intermediate the fully open or fully closed positions of the valve, at which intermediate positions the non-circular portion or portions on the valve stem are out of engagement with the non-circular recess or recesses provided in one of the sections of the valve casing.

It is a further object of my present invention to provide a valve of the above mentioned character that is simple in construction and operation, cheap and easy to manufacture and assemble, strong and durable, and highly efficient in the purposes for which designed.

Referring to the accompanying drawings wherein for the purpose of illustration I have shown several preferred embodiments of my present invention, Figure 1 is a vertical sectional view of a valve embodying the features of my present invention and showing the valve in fully closed position, Figure 2 is a vertical sectional view of the valve shown in Figure 1, this view being taken at right angles to that of Figure 1, and showing the valve in fully open position, Figure 3 is a transverse sectional view on the line 3—3 of Figure 1, Figure 4 is a fragmentary view partly in section, showing a preferred means of attaching the lower end of the valve stem to the valve disc, Figure 5 is a vertical sectional view similar to Figure 2 and showing the valve in a position intermediate its fully open and closed positions, Figures 6 and 7 are transverse sectional views on the lines 6—6 and 7—7, respectively, of Figure 1, the valve operating handle or "key" in Figure 7 being shown partly in elevation, Figure 8 is a fragmentary perspective, exploded view of one form of valve stem and a part of the operating mechanism therefor, Figure 9 is a fragmentary, vertical sectional view of a composite valve casing showing the valve stem and valve disc in elevation, with the valve in fully closed position, Figure 10 is a vertical sectional view of the valve shown in Figure 9, this view being taken at right angles to that of Figure 9, and showing the valve in fully open position, Figure 11 is a fragmentary, vertical sectional view of a composite valve casing showing the valve stem and valve disc in elevation, with the valve in fully closed position, Figure 12 is a vertical sectional view of the valve shown in Figure 11, this view being taken at right angles to that of Figure 11, and showing the valve in fully open position, Figure 13 is a fragmentary, vertical sectional view of a modified form of my composite valve casing showing the valve stem and valve disc in elevation, with the valve in fully closed position.

Figure 14 is a vertical sectional view of the valve shown in Figure 13, this view being taken at right angles to that of Figure 13, and showing the valve in fully open position.

Figure 15 is a plan view of the lowermost section of the composite valve casing shown in Figures 13 and 14.

Figure 16 is an enlarged fragmentary view, partly in section, showing a modified means of attaching the lower end of the valve stem to the valve disc, and Figure 17 comprises a plan view and an inverted plan view of an element of the construction shown in Figures 13 and 14.

In the accompanying drawings, wherein like reference numerals are employed to designate like parts throughout the several views, the numeral 1 designates the lower section of the valve casing, this lower portion being provided with aligned, internally-threaded inlet and outlet openings 2 and 3, respectively, at the inner, opposed ends of which are positioned valve seats 4 and 5, the inner faces of these valve seats being tapered or inclined to cooperate with a tapered, imperforate valve disc 6, it being understood that when the said valve disc 6 is in its lowermost position, as shown in Figure 1, the tapered valve disc 6 firmly engages the inner, tapered faces of the valve seats 4 and 5 and prevents the flow of fluid through the valve casing. The upper end 7 of the base portion 1 is internally threaded and receives therein the lowermost externally threaded portion 8 of the intermediate casing section 9, the internal threads in the upper end 7 of the valve casing section 1 and the cooperating, external threads of the lowermost threaded portion 8 preferably being "right hand" threads. Immediately above the threaded portion 8 is a square, hexagonal or other non-circular portion 10 adapted for engagement by a suitable wrench to assist in screwing these two sections together. Immediately above the non-circular portion 10 is a reduced, externally-threaded portion 11, the threads of which are preferably "right hand" threads. Immediately above the reduced, externally-threaded portion 11 is an unthreaded portion 12. The intermediate casing section 9 is provided with a packing recess or chamber 13 adapted to receive therein a suitable packing which is compressed within the recess or chamber by means of a threaded nut or "follower" 14. The lower surface of the intermediate casing section 9 is provided with a non-circular recess 15, while the upper surface of said section is provided with a non-circular recess 16 immediately above the threaded nut or "follower" 14, the purposes of these two non-circular recesses to be hereinafter described.

The upper section 17 of the composite valve casing has a relatively long, axially-extending chamber 18, from one side of which extends a socket 19, the axis of which is transverse to the axis of the chamber 18. Diametrically opposite the socket 19 and in axial alignment therewith is an opening 20, which extends through the wall of the section 17 and terminates in an outer socket 21, the diameter of which is slightly greater than the diameter of the opening 20. Preferably the exterior surface of the casing section 17 has a flattened non-circular portion thereon to be engaged by a suitable wrench to assist in screwing this section to the intermediate section 9. The outer ends of the chambers 18 and 19 are closed as clearly shown in Figure 1 of the accompanying drawings. A straight slot or groove 22 is formed on the inner wall of the casing section 17 and extends downwardly from the inner open end of the chamber 19 to the lower end of the chamber 18, this slot or groove serving as a guide for a reciprocating valve stem to be hereinafter described. This slot or groove 22 is best seen in Figures 1 and 6 of the accompanying drawings.

The valve stem of my present invention comprises an intermediate section 23, circular in transverse cross-section; a lower section comprising a substantially spherical member 24 which constitutes one member of a ball-and-socket connection between the valve disc 6 and the the valve stem; and, in those forms of my invention shown in Figures 1, 2, 5, 8, 11, 12, 13, 14 and 16 of the accompanying drawings, a section 25 of non-circular cross-section and of a size and shape corresponding to the size and shape of the non-circular recess 15 in the intermediate section 9 of the composite valve casing above described. The intermediate section 23 of the valve stem terminates at its upper end in a threaded portion, the threads of which are preferably "left hand" threads. As a means for reciprocating the above referred to valve stem to move the valve disc 6 to and from open and closed position with respect to the valve seats 4 and 5, I attach to the upper threaded end of the intermediate section 23, a substantially cylindrical member 26 of a diameter slightly less than the diameter of the chamber 18 so that said member 26 is axially slidable within said chamber. An intermediate portion of the member 26 is cut away, as indicated at 27, and the flat surface thereof is provided with a series of transverse teeth 28 which constitute a gear rack. Adjacent one edge of the gear rack constituted by the teeth 28, I provide a series of spaced, substantially semi-circular recesses 29, 30 and 31, as best shown in Figure 8 of the accompanying drawings, the purposes of these recesses to be hereinafter described.

In those forms of my invention illustrated in Figures 1, 2, 5, 8, 9 and 10 of the accompanying drawings, the member 26 is provided at its lower end with a reduced, non-circular portion 32 of a size and shape corresponding to the size and shape of the non-circular recess 16 provided at the upper end of the intermediate section 9 of the composite valve casing. The substantially cylindrical member 26 is provided near its lower end with a lug or projection 33 adapted for insertion within the slot or groove 22 in the upper casing section 17.

The valve disc of those forms of my invention shown in Figures 1, 2, 4, 5, 8 and 9 to 12 inclusive of the accompanying drawings, comprises an imperforate, disc-like member 6, having straight grooves 34 and 35 extending vertically along opposite portions of the periphery thereof, which grooves cooperate with guide bars 36 and 37 formed along opposite walls of the valve chamber within the lower section 1 of the composite valve casing, the cooperation between said grooves and guide bars confining the valve disc to straight reciprocating movements within the valve casing and definitely preventing rotation of said disc with respect to said valve casing. The valve disc is provided with a radial bore 38 and with a chamber or recess 39 extending outwardly from said bore, the length of the chamber or recess 39 being in excess of the diameter of the substantially spherical portion 24 on the lower end of the valve stem, the wall defining the chamber or recess 39 being sufficiently flexible to permit the upper end thereof to be spun over the upper surface of the substantially spherical portion 24 to constitute with said portion a ball and socket type joint. A compression spring 40 is adapted for insertion within the radial bore 38 for a purpose to be hereinafter described.

The valve disc of that form of my invention shown in Figures 13, 14 and 16 of the accompanying drawings, and also the lower end of the valve stem shown in these figures, differ from the valve disc 6 and from the substantially spherical end portion 24 shown in the remaining figures of said drawings. As best illustrated in Fig. 16, the radial bore 38 terminates at its outer end in a non-circular recess 41, and the inner surface of the chamber or recess 39 is internally threaded to receive therein a substantially semi-spherical cap 42, while the lower end of the valve stem 23 below the non-circular portion 25 is provided with a substantially semi-spherical portion 43, below which is positioned a non-circular portion 44 of a shape and size corresponding to the shape and size of the non-circular recess 41 within the valve disc. Referring, further, to that form of my invention shown in Figures 13, 14, 15 and 16, it will be noted that I provide a novel means for effecting an interlock between the lower casing section 1, the intermediate casing section 9 and the valve stem, when the valve is in open position. For this purpose, I associated with the casing sections and with the valve stem an inner bonnet 45, the lower side surface of which is flattened, as at 46, to render the said side surface non-circular. The top of the bonnet 45 is provided with a non-circular opening 47 of a size and shape corresponding to the non-circular recess 15 formed in the intermediate casing section 9. In this form of my invention, the lower casing section 1 is formed with a non-circular recess immediately below the internal threads within the upper end 7 of said section, this recess having flattened side walls, as at 48, to render the recess non-circular, and being of a size and shape corresponding to the size and shape of the lower, non-circular, side surface of the bonnet 45.

As a means for actuating the valve to and from open and/or closed position and for positively retaining said valve in either open, closed or intermediate position, I mount within the socket 19 a coiled, expansion spring 49 having its outer end bearing against the end wall of said socket and having its inner end engaged behind a cup-shaped detent member 50, the tendency of the said spring being to force said cup-shaped detent member 50 into engagement with one of the substantially semi-circular recesses 29, 30 or 31 adjacent one edge of the gear rack constituted by the teeth 28 on the member 26 of the valve stem. The actuating handle or "key" is shown and described in detail in my Patent No. 2,213,264, dated Sept. 3, 1940, of which the present application is a continuation-in-part, and comprises a stem 51, to one end of which is keyed a knob or handle 52, and which has keyed or splined thereon, near its opposite end, a pinion 53, the teeth of which correspond in pitch to the teeth 28 on the member 26 of the valve stem. Between the knob or handle 52 and the pinion 53, I provide the stem 51 with a disc 54 of a diameter corresponding substantially to that of the socket 21 formed in the top casing section 17. The end of the stem 51 opposite to that at which the knob or handle 52 is attached, is reduced, as shown at 55, and is of a diameter and length slightly less than that of the axial bore within the cup-shaped detent 50.

When any of the valves shown and described in connection with Figures 1 to 12 inclusive of the accompanying drawings are rigidly connected in a pipe line, it will be obvious that the lower casing section 1 cannot be rotated with respect to said pipe line or with respect to the intermediate casing section 9. If found desirable, I may employ a locking pin 56 as a means for positively preventing rotation of the lower casing section 1 with respect to the intermediate section 9 when the said sections are tightly screwed together. When such a locking pin is employed, a hole is drilled through the upper end 7 of the lower casing section 1 and partly through the externally-threaded portion 8 of the intermediate casing section 9 after the said sections 1 and 9 are tightly screwed together, and the locking pin 56 is driven into this hole to lock the two sections together and to positively prevent relative rotation thereof.

Having thus described the structure of the several preferred forms of my present invention, reference will now be made to the manner of assembling the casing sections, valve stem and valve disc and to the operation of the valve as thus assembled. Suitable packing material is first inserted within the recess or chamber 13 in the intermediate section 9 of the casing and the threaded nut or "follower" 14 is lightly screwed down upon the upper edge of said packing. When assembling that form of my invention shown in Figures 1 to 12 inclusive of the accompanying drawings, the spring 40 is inserted within the radial bore 38 in the valve disc 6; the substantially spherical member 24 is inserted within the chamber or recess 39 in the valve disc 6; and the outer end of the wall defining the chamber or recess 39 is spun over the upper surface of the portion 24 to constitute with said portion a ball-and-socket type joint, it being understood that when thus assembled, the valve stem is capable of partaking of axial and rotative movements with respect to the valve disc 6 and that the spring 40 normally tends to force the substantially spherical portion 24 toward the outer end of the chamber or recess 39 so that the upper surface of said portion will coact with the spun-over wall at the outer end of the recess to form the desired ball-and-socket type joint, the length of said chamber or recess 39 being greater than the diameter of the portion 24 to permit relative axial movement between the valve disc 6 and the valve stem. The upper end of the stem section 23 is then passed upwardly through the bore within the intermediate casing section 9 and the packing within the chamber 13 is compressed tightly about the said stem section by rotation of the nut or "follower" 14. The lower casing section 1 is then screwed on to the lower end of the intermediate casing section 9, the vertical grooves 34 and 35 on the valve disc 6 being engaged, respectively, with the vertical guide bars 36 and 37 formed along opposite walls of the valve chamber within the lower casing section 1, the above described ball-and-socket connection between said stem and said valve disc permitting relative rotation between the stem and valve disc and thus permitting the lower and intermediate sections of the casing to be tightly screwed together. As above mentioned, the threads forming the threaded connection between the casing sections 1 and 9 are preferably "right hand" threads, although this is not essential, as will presently appear. After the sections 1 and 9 are screwed together they may, if desired, be drilled for the reception of a locking pin 56 which serves to prevent separation of said sections.

The upper end of the stem section 23, which now projects above the upper end of the intermediate casing section 9 next has attached thereto the stem section 26, it being noted that the threaded connection between said sections preferably comprise "left-hand" threads and that during the operation of connecting these valve stem sections, the non-circular portion 25 of the valve stem is preferably in engagement within the non-circular recess 15 to prevent the stem section 23 from turning when the stem section 26 is being screwed thereon. When assembling that form of my invention shown in Figures 9 and 10 wherein the non-circular recess 15 and non-circular portion 25 are omitted, the friction of the packing within the chamber 13 is generally sufficient to prevent rotation of the stem section 23 as the stem section 26 is being screwed thereon. If such friction is insufficient to prevent such rotation of the stem section 23, it will be obvious that said section may be engaged by a suitable wrench or gripping tool and held against rotation.

The upper casing section 17 is then moved downwardly over the upper section 26 of the valve stem with the lug or projection 33 on the lower end of the stem section 26 slidably engaging the vertical slot or groove 22 formed on the inner wall of the casing section 17. The casing section 17 is then screwed on to the upper threaded end of the intermediate casing section 9, it being understood that during the operation of connecting the said two sections there is no engagement between the non-circular projection or projections on the valve stem and the non-circular recess or recesses in the intermediate casing section 9. As above mentioned, the threaded connection between the casing section 9 and 17 preferably comprises "right hand" threads, which threads are of opposite pitch to that of the threads constituting the threaded connection between the valve stem sections 23 and 26. Prior to the application of the upper casing section 17 to the intermediate section 9, the spring 49 is inserted within the chamber 19 and the cup-shaped detent 50 is inserted within said chamber and, when the section 17 is moved downwardly over the stem section 26 as above described, the said detent is compressed by the handle or key or by a suitable tool so that said casing section 17 may be moved downwardly over said stem section 26, withdrawal of the handle or key or other tool utilized to compress the detent 50 against the spring 49 permitting the said detent to enter the intermediate recess 30 formed along the side of the stem section 26, it being understood that when assembling the upper section 17 of the casing to the intermediate section 9 there-
of, the valve stem and valve disc are in a position intermediate their open and closed positions.

The manner of assembling the component parts of that form of my invention shown in Figures 13 to 17 inclusive of the accompanying drawings differs somewhat from that above described in connection with those forms of my invention shown in the remaining figures of the drawings, in that there is a difference in the means for connecting the valve disc 6 to the lower end of the valve stem and an interlock is provided between the valve stem and valve disc, and an additional interlock is provided between the said valve stem and the lower and intermediate casing sections. When assembling that form of my invention shown in Figures 13 to 17 inclusive, the substantially semi-spherical cap 42 is affixed to the lower portion of the valve stem section 23 by spinning the upper edge of said cap over the substantially semi-spherical portion 43 of the valve stem, in a manner such as to permit relative rotation of said cap with respect to said stem. After inserting the spring 40 within the radial bore 38, the stem and disc are attached by screwing the cap 42 within the upper end of the chamber or recess 39, the spring 40 normally preventing engagement between the non-circular portion 44 and the non-circular recess 41 formed in the valve disc 6 immediately above the radial bore 38, i. e., when thus assembled, the valve stem and valve disc normally occupy the positions shown in Figure 16, it being understood that the length of the chamber or recess 39 is such that the stem can readily partake of axial movement with respect to the valve disc so as to permit the non-circular portion 44 to be moved into and out of engagement with the non-circular recess 41, and that the engagement between the semi-spherical portion 43 and the substantially semi-spherical cap 42 constitute a joint permitting relative rotation between the valve stem and valve disc. The valve stem and valve disc, when thus assembled, are ready for insertion within the composite valve casing. After the insertion of suitable packing material within the chamber 13, the upper end of the stem section 23 is passed upwardly through the opening 47 in the top of the bonnet 45 and through the bore within the intermediate casing section 9, which section overlies the said bonnet with the non-circular opening 47 in the bonnet in registration with the non-circular recess 15 in the said intermediate section 9. The nut or "follower" 14 is then rotated to tightly compress the packing about the stem section 23. The lower casing section 1 is then screwed on to the lower end of the intermediate casing section 9, the vertical grooves 34 and 35 on the valve disc 6 being engaged, respectively, with the vertical guide bars 36 and 37 formed along the opposite walls of the valve hhamber within the lower section 1, the above described connection between said stem and valve disc permitting relative rotation between the valve stem and valve disc and thus permitting the lower and intermediate sections of the casing to be tightly screwed together. During the operation of assembling the lower and intermediate casing sections, the non-circular, lower edge of the bonnet 45 is in non-rotative engagement with the non-circular recess formed in the lower casing section by the flattened portions 48 and hence there is no relative rotation between the said bonnet and lower section but the intermediate section 9 is readily rotatable with respect to said bonnet and lower section to permit the said sections to be screwed together, it being understood, of course, that during the operation of assembling these sections, the non-circular portions 25 and 44 of the valve stem are out of engagement with their respective cooperating recess 47 and 15 in the bonnet 45 and intermediate casing section 9 and with the recess 41 formed in the valve disc 6. The manner of assembling the valve casing section 17 and the valve stem section 26 in that form of my invention shown in Figures 13 to 17 inclusive corresponds to that employed for assembling corresponding sections of that form of my invention shown in the remaining figures of the accompanying drawings, it being understood that when assembling the sections of the composite valve casing, the valve stem and valve disc are always in their intermediate positions in which there is no engagement between the non-circular portion or portions on the valve stem and the non-circular recess or recesses in the valve casing or valve disc.

In that form of my invention shown and described in connection with Figures 1 to 8 inclusive of the accompanying drawings, the construction is such that the interlocks between the casing sections and valve stem are definitely established and maintained when the valve is in either open or closed position and in which the said interlocks are rendered ineffective when the valve is moved to an intermediate position. This is by virtue of the engagement between the non-circular projection 25 and the recess 15 when the valve is fully opened, and the engagement between the non-circular portion 32 and the recess 16 when the valve is fully closed, together with the engagement between the lug or projection 33 within the groove 22 in the upper casing section and the difference in direction of pitch between the threads connecting the casing sections and the threads connecting the upper stem section 26 to the stem section 23. When the valve is rigidly inserted in a pipe line, it will be obvious that the lower casing section 1 cannot be rotated with respect to the pipe line or with respect to the superimposed, connected casing sections, but I may, if desired, secure said sections 1 and 9 against separation by the use of the locking pin 56 above described. As long as one of the non-circular projections on the valve stem is in engagement with its cooperating recess in the valve casing, it is impossible to rotate the valve casing sections 9 and 17 with respect to the lower casing section 1 by virtue of the construction and arrangement of parts shown and described in connection with Figures 1 to 8 of the accompanying drawings.

When it is desired to actuate the valve from the closed position shown in Figure 1 to the open position shown in Figure 2, or to the intermediate position shown in Figure 5, the operating handle or "key" is inserted through the opening 20 and is moved inwardly until the disc 54 engages the inner wall of the recess 21. During the insertion of the handle or "key," the inner, reduced end 55 thereof enters within the cup-shaped detent 50 and moves the same inwardly of the socket 19 against the tension of the spring 49, the pinion 53 sliding into engagement with the teeth 28 on the section 26 of the valve stem. It is to be particularly noted that the inner end 55 of the stem extends a sufficient distance beyond the pinion 53 to effect the movement of the detent 50 out of engagement with the uppermost recess 29 and out of the line of travel of the valve stem and that the disc 54 is so spaced from the pinion 53 that when said disc engages the inner wall of the recess 21, the detent 50 is compressed within the socket 19 and the pinion 53 is properly engaged with the teeth 28. When thus inserted, the handle or "key" can be readily rotated to move the valve disc 6 to the open position shown in Figure 2 or, if it is desired to disassemble the sections of the valve casing, to the intermediate position shown in Figure 5. When it is desired to move the valve from the open position shown in Figure 2 to the intermediate position shown in Figure 5, or to the closed position shown in Figure 1, insertion of the handle or "key" in the manner above described and rotation thereof in the opposite direction will move the valve to closed position. When the valve disc 6 is moved to its fully closed, intermediate or open positions and the handle or "key" removed, the spring 49 forces the detent 50 into engagement with the recesses 29, 30 or 31, respectively, thus locking the valve in closed, intermediate or open position, in which position the valve will remain until the same or a similar handle or "key" is again inserted to depress the detent 50 out of engagement with the recesses 29, 30 or 31. It is to be particularly noted that the cup-shaped detent 50 serves as a means for locking the valve in either open, intermediate or closed position, and that it functions as an inner bearing for the handle or "key." It will be obvious that the arrangement, size and pitch of the teeth 28 which constitute the rack, and of the teeth on the pinion 53, may be varied so that an operating handle or "key" which will effectively actuate one valve or a selected series of valves, will not function to operate another valve or series of valves. The provision of the axially and resiliently movable connection between the lower end of the valve stem and the valve disc is an important feature of my present invention, for, as will be readily appreciated, there is a definite relation between the length of the casing sections, the length of the valve stem and valve disc, the distance between the non-circular portions on the valve stem, the distance between the upper and lower non-circular recesses, the spacing of the recesses 29, 30 and 31, etc., and to avoid the necessity of extremely accurate machining operations when manufacturing the component parts of the valve, I provide the aforesaid axially and resiliently movable connection to insure that the valve disc 6 will be moved into firm and sealing contact with the valve seats 4 and 5 to tightly close the valve when the valve stem is moved to its lowermost position.

In that form of my invention shown in Figures 9 and 10 of the accompanying drawings, the construction is such that the casing sections are interlocked to the valve stem only when the valve is moved to closed position, due to the engagement between the non-circular portion 32 on the valve stem and the non-circular recess 16 at the top of the intermediate casing section 9, while in that form of my invention shown in Figures 11 and 12, the construction is such that the casing sections are interlocked to the valve stem only when the valve is moved to open position, due to the engagement between the non-circular portion 25 on the valve stem and the non-circular recess 15 at the bottom of the intermediate casing section 9. It is believed that the operation of these two forms of my present invention will be readily apparent from the above description of the operation of that form of my invention shown in Figures 1 to 8 inclusive.

Referring to the operation of the construction shown and described in connection with Figures 13 to 17 inclusive of the accompanying drawings, it will be noted that, as in the form of my invention shown in Figures 1 to 8 inclusive, I have provided means for interlocking the casing sections when the valve is in either open or closed position, and also means for positively locking the intermediate casing section to the lower casing section when the valve is moved to open position. In this construction, the interlock between the valve stem and casing sections when the valve is in closed position as shown in Fig. 13, is effected by the engagement between the non-circular portion 44 at the extreme lower end of the valve stem section 23 and the non-circular recess 41 formed in the valve disc 6, it being obvious that when the said portion and recess are in engagement, i. e., when the valve stem and valve disc have been moved to their lowermost positions, there can be no relative rotation between the said stem and valve disc. As the vertical grooves 34 and 35 are in engagement with their respective guide bars 36 and 37 formed along opposite sides of the valve chamber within the lower casing section 1, it will be obvious that it is impossible to rotate the valve disc with respect to the said lower casing section. As the valve is moved toward closed position the valve disc will contact the cooperating valve seats 4 and 5 and continued movement of the valve stem toward closed position will cause the non-circular portion 44 on the valve stem to enter the non-circular recess 41 in the valve disc, this relative movement compressing the spring 40 within the radial bore 38, which spring functions to maintain the valve disc 6 tightly in contact with the valve seats 4 and 5 in the event that complete downward movement of the valve stem does not positively force the said disc into tight and sealing contact with the said valve seats, and also functions as a means for separating the non-circular projection 44 from the non-circular recess 41 as the valve is moved toward open position.

When the valve shown in Figures 13 to 17 inclusive of the accompanying drawings is in open position as shown in Figure 14, the valve disc 6 assumes a position with respect to the valve stem as best illustrated in Figure 16, and in this open position of the valve, the non-circular projection 25 is in engagement within the non-circular opening 47 in the bonnet 45 and with the non-circular recess 15 in the lower portion of the intermediate casing section 9. As there is a non-rotative connection between the lower edge of the bonnet 45 and the lower casing section 1 due to the flattened surfaces 46 on the bonnet and the flattened surfaces 48 on the walls defining the recess in the lower casing section, it will be obvious that there can be no rotation of the intermediate casing section 9 with respect to the lower casing section 1 or with respect to the valve stem as long as the valve remains in open position. Nor is it possible to rotate the upper section 17 with respect to the intermediate casing section 9 or with respect to the valve stem when the valve shown in Figures 13 to 17 inclusive is in either open or closed position, due to the interlocks provided between said upper casing 17 and the valve stem, all as fully illustrated and described in connection with the construction and operation of the several forms of my invention shown in Figures 1 to 12 inclusive.

The provision of the bonnet 45 and the above described interlock between said bonnet and the valve stem and lower casing section constitutes an effective and satisfactory means for locking the lower and intermediate casing sections 1 and 9 together when the valve is in open position. The use of the locking pin 56 is optional in connection with the form of my present invention shown in Figures 13 to 17 inclusive, it being obvious that the provision of the bonnet 45 reduces the necessity or desirability of using such a locking pin to the minimum, especially when it is considered that the lower casing section 1 cannot be readily rotated with respect to the remainder of the valve as long as said valve is rigidly secured in a pipe line leading to and from the inlet and outlet openings 2 and 3 of the casing section 1.

It is to be understood that the several forms of my invention shown and described herein are to be taken as preferred embodiments of my present invention, and that various changes may be made in the size, shape and arrangement of parts without departing from the spirit of my invention or the scope of the subjoined claims. For example, features of one form of my invention may be used independently or be combined with other forms thereof, as by employing the valve stem and valve disc interlock shown in Figure 16 as a means for interlocking the valve stem and, through the valve disc, the casing sections only when the valve is in closed position. Or, if desired, the form of my invention shown in Figure 16 may be combined with the form of my invention shown in other figures of the drawings, as for example, by combining the form of the invention shown in Figs. 9 and 10 with the form of my invention shown in Figure 16, to thus provide a construction in which the valve casing sections are interlocked with the valve stem when the valve is in either open or closed position. Or, if desired, the form of my invention shown in Figures 13, 14, 15 and 17 may be used as a means for interlocking the casing sections only when the valve is in open position, or this form of the invention may be employed in combination with the form of my invention shown in Figures 9 and 10, to thus provide a construction in which the valve casing sections are interlocked with the valve stem when the valve is in either open or closed position. Other modifications and combinations will readily suggest themselves to those skilled in the art.

While I have referred to the threads connecting the casing sections 1 and 9 and the casing sections 9 and 17 as "right hand" threads, and the threads connecting the stem sections 23 and 26 as "left hand" threads, such a relationship of threads is not essential to the fulfillment of my present invention, as the threads between the casing sections 1 and 9 and 9 and 17 might well be "left hand" threads and those between the stem sections 23 and 26 "right hand" threads, it having been found that it is preferable that the threads between the casing sections 1, 9 and 17 be of opposite pitch to the threads between the stem sections 23 and 26. Further, in any case where the locking pin 56 is utilized, the direction of pitch of the threads between the casing sections 1 and 9 is immaterial. While I have illustrated and described a construction in which the valve stem is provided with a lug or projection 33 adapted to slide within and be guided within a groove 22, it will be obvious that the stationary guide means within the casing section 17 may comprise a guide bar and that the valve stem may be provided with a groove or notch, such, for example, as shown in my application Serial No. 151,007 filed June 29, 1937, now Patent No. 2,213,264, dated Sept. 3, 1940, to guide the valve stem during its reciprocating movements and to prevent relative rotation between the valve stem and upper casing section 17.

I have elected to illustrate and describe herein my present invention as applied to a reciprocating valve of the imperforate disc type, but it is to be definitely understood that my present invention is not restricted to a valve of this specific character and that there are many types of valve, such, for example, as globe valves, plug valves, etc., wherein a valve stem reciprocates within a valve casing to move the valve to open or closed positions and wherein the features of my invention would be readily applicable.

There are many instances where valves of the general type illustrated and described herein will be very useful, either for the control of liquids or gases, and wherein it is necessary or desirable that the valve be rendered "fool proof" so that when the valve member is moved to either closed or open position or to closed and open position, the several parts of the valve casing are interlocked with the valve stem, whereby the casing sections cannot be taken apart by unauthorized persons who might desire to change the position of the valve without proper authority and/or without employing the necessary operating "key" or handle. For example, the valve of my present invention is especially useful as a means for controlling the water supply from municipal water mains to individual residences, apartments, factories or the like, and when utilized for this purpose, the duly authorized agent of the municipality is supplied with a suitable operating handle or "key" which can be used to open the valve, or to close the valve if for any reason, such as discontinuance of service, non-payment of water rent, etc., it becomes necessary that the valve member be moved to and retained in closed position. The valve or valves of my present invention are also applicable for use in various pipe lines, as delivery valves for tank wagons, tank trucks, tank cars or the like, where it is highly desirable to employ a valve that can be locked in closed or open position until operated by an authorized person having in his possession the necessary operating handle or "key," and wherein it is desirable or necessary that the sections of the valve casing cannot be separated to permit access to the valve disc and valve mechanism to effect a change in the position or "setting" of said valve. There are numerous instances wherein it is necessary or desirable to lock a valve in open position, for example, such a valve is especially useful in connection with meters for liquids and gases, wherein it is essential to the proper functioning of the meter, especially meters of the compound type, that the valve or valves leading from the supply to the meter be constantly maintained in its fixed, fully open position, in order to insure correct registration of the meter or meters.

In my application Serial No. 151,007 filed June 29, 1937, now Patent No. 2,213,264, dated Sept. 3, 1940, I have shown, described and claimed many features of the valve and valve actuating mechanism shown and described herein, and no claim is made in this application to the features covered by the claims of said application and patent, the present application and the claims presented therein having been restricted to the novel interlocking means by which the casing sections are secured together when the valve is in open and/or closed position, and wherein the said sections may be separated only when the valve is moved to an intermediate position or positions. The specific means shown herein for reciprocating the valve stem is not essential to the proper operation of my present invention, i. e., any means, either manual, electric, hydraulic or otherwise, might be employed to reciprocate the valve stem and valve disc without departing from the spirit of my present invention or from the scope of the subjoined claims.

Having thus described my invention, I claim:

1. A valve including a casing composed of a plurality of separable sections, a valve stem within said casing, a valve head connected to said stem within said casing to control the flow of fluid through said valve, means for moving said valve stem to selectively move the valve head to open, intermediate or closed position, and interlocks between said valve stem and casing sections in engagement to prevent relative rotation between said valve stem and casing sections and separation of said sections when the valve head is in open or closed position, disengagement of said interlocks permitting relative rotation between said valve stem and casing sections and separation of said casing sections when the valve head is in intermediate position.

2. A valve including a casing composed of a plurality of separable sections, a valve stem within said casing, a valve head connected to said stem within said casing to control the flow of fluid through said valve, means for moving said valve stem to selectively move the valve head to and from its closed position, and interlocks between said valve stem and casing sections in engagement to prevent relative rotation between said valve stem and casing sections and separation of said sections when said valve head is in closed position and disengaged to permit relative rotation between said valve stem and casing sections and separation of said sections when the valve head is not in closed position.

3. A valve including a casing composed of a plurality of separable sections, a valve stem within said casing, a valve head connected to said stem within said casing to control the flow of fluid through said valve, means for moving said valve stem to selectively move the valve head to and from its open position, and interlocks between said valve stem and casing sections in engagement to prevent relative rotation between said valve stem and casing sections and separation of said sections when said valve head is in open position and disengaged to permit relative rotation between said valve stem and casing sections and separation of said sections when said head is not in open position.

4. A valve including a lower casing section and an upper casing section separable from said lower section when rotated relatively thereto, a valve stem extending from said lower section into said upper section, a valve head connected to said stem within said lower section to control the flow of fluid through said valve, means for moving said valve stem to selectively move the valve head to open, intermediate or closed position, an interlock between said valve stem and upper section in engagement to prevent rotation of said upper section with respect to said valve stem, and interlocks between said valve stem and lower section in engagement to prevent rotation of said upper and lower sections when the valve head is in open or closed position, disengagement of said interlocks permitting rotation of said upper section with respect to said lower section when the valve head is in intermediate position.

5. A valve including a lower casing section and an upper casing section separable from said lower section when rotated relative thereto, a valve stem extending from said lower section into said upper section, a valve head connected to said stem within said lower section to control the flow of fluid through said valve, means for moving said valve stem to selectively move the valve head to and from its closed position, an interlock between said valve stem and upper section in engagement to prevent rotation of said upper section with respect to said valve stem, and an interlock between said valve stem and lower section in engagement to prevent rotation of said upper and lower sections when the valve head is in closed position and disengaged to permit relative rotation of said sections when the valve head is not in closed position.

6. A valve including a lower casing section and an upper casing section separable from said lower section when rotated relative thereto, a valve stem extending from said lower section into said upper section, a valve head connected to said stem within said lower section to control the flow of fluid through said valve, means for moving said valve stem to selectively move the valve head to and from its open position, an interlock between said valve stem and upper section in engagement to prevent rotation of said upper section with respect to said valve stem, and an interlock between said valve stem and lower section in engagement to prevent rotation of said upper and lower sections when the valve head is in open position and disengaged to permit relative rotation of said sections when the valve head is not in open position.

7. A valve including a lower casing section, an intermediate casing section and an upper casing section assembled to constitute a composite valve casing, the sections of which are separable when rotated relative to each other; a valve stem extending from said lower section, through the intermediate section and into the upper section; a valve head connected to said stem within said lower section to control the flow of fluid through said valve; means for moving said valve stem to selectively move the valve head to open, intermediate or closed position; an interlock between said lower and intermediate sections in engagement to prevent relative rotation thereof; an interlock between said valve stem and said upper section in engagement to prevent relative rotation thereof; and interlocks between said valve stem and intermediate section in engagement to prevent relative rotation between said upper and intermediate sections when the valve head is in open or closed position, disengagement of said last-mentioned interlocks permitting rotation of said upper section with respect to said intermediate section when the valve head is in intermediate position.

8. A valve including a lower casing section, an intermediate casing section and an upper casing section assembled to constitute a composite valve casing, the sections of which are separable when rotated relative to each other; a valve stem extending from said lower section, through the intermediate section and into the upper section; a valve head connected to said stem within said lower section to control the flow of fluid through said valve; means for moving said valve stem to selectively move the valve head to and from its closed position; an interlock between said lower and intermediate sections in engagement to prevent relative rotation thereof; an interlock between said valve stem and said upper section in engagement to prevent relative rotation thereof; and an interlock between said valve stem and intermediate section in engagement to prevent relative rotation between said upper and intermediate sections when the valve head is in closed position, disengagement of said last-mentioned interlock permitting rotation of said upper section with respect to said intermediate section when the valve head is not in closed position.

9. A valve including a lower casing section, an intermediate casing section and an upper casing section assembled to constitute a composite valve casing the sections of which are separable when rotated relative to each other; a valve stem extending from said lower section, through the intermediate section and into the upper section; a valve head connected to said stem within said lower section to control the flow of fluid through said valve; means for moving said valve stem to selectively move the valve head to and from its open position; an interlock between said lower and intermediate sections in engagement to prevent relative rotation thereof; an interlock between said valve stem and said upper section in engagement to prevent relative rotation thereof; and an interlock between said valve stem and intermediate section in engagement to prevent relative rotation between said upper and intermediate sections when the valve head is in open position, disengagement of said last-mentioned interlock permitting rotation of said upper section with respect to said intermediate section when the valve head is not in open position.

10. A valve including a lower casing section and an upper casing section separable from said lower section when rotated relative thereto, said lower section having spaced, non-circular recesses formed therein; a valve stem extending from said lower section into said upper section and having spaced, non-circular portions thereon of a size and shape corresponding to the size and shape of the recesses in the lower section; a valve head connected to said stem within said lower section to control the flow of fluid through said valve; means for moving said valve stem to selectively move the valve head to open, intermediate or closed position and to move one of the non-circular portions on the stem into one of the non-circular recesses in the lower section when the valve head is moved to open or closed position; and an interlock between said valve stem and upper section in engagement to prevent rotation of said upper section with respect to said valve stem, engagement between one of the non-circular portions on the valve stem and one of the non-circular recesses in the lower section, when the valve head is in open or closed position, preventing relative rotation of said sections, and non-engagement between said portions and recesses when the valve head is in intermediate position permitting relative rotation of said sections.

11. A valve including a lower casing section and an upper casing section separable from said lower section when rotated relative thereto, said lower section having a non-circular recess formed therein; a valve stem extending from said lower section into said upper section and having a non-circular portion thereon of a size and shape corresponding to the size and shape of the recess in the lower section; a valve head connected to said stem within said lower section to control the flow of fluid through said valve; means for moving said valve stem to selectively move the valve head to and from its closed position and to move said non-circular portion on the stem into said non-circular recess when the valve head is moved to closed position; and an interlock between said valve stem and upper section in engagement to prevent rotation of said upper section with respect to said valve stem, engagement between said non-circular portion on the stem and said non-circular recess, when the valve head is in closed position, preventing relative rotation of said sections, and non-engagement between said portion and recess when the valve is not in closed position permitting relative rotation of said sections.

12. A valve including a lower casing section and an upper casing section separable from said lower section when rotated relative thereto, said lower section having a non-circular recess formed therein; a valve stem extending from said lower section into said upper section and having a non-circular portion thereon of a size and shape corresponding to the size and shape of the recess in the lower section; a valve head connected to said stem within said lower section to control the flow of fluid through said valve; means for moving said valve stem to selectively move the valve head to and from its open position and to move said non-circular portion on the stem into said non-circular recess when the valve head is moved to open position; and an interlock between said valve stem and upper section in engagement to prevent rotation of said upper section with respect to said valve stem, engagement between said non-circular portion on the stem and said non-circular recess, when the valve head is in open position, preventing relative rotation of said sections, and non-engagement between said portion and recess when the valve is not in open position permitting relative rotation of said sections.

13. A valve including a lower casing section and an upper casing section separable from said lower section when rotated relative thereto; a valve stem extending from said lower section into said upper section, there being a sliding and non-rotative connection between said stem and said upper section; a valve head connected to said stem within said lower section to control the flow of fluid through said valve; means for moving said valve stem to move the valve head to either open, intermediate or closed position; and an interlock between said valve stem and lower section in engagement to prevent relative rotation of said upper and lower sections when the valve head is in either open or closed position, disengagement of said interlock permitting rotation of said upper section with respect to said lower section when the valve head is in intermediate position.

14. A valve including a lower casing section and an upper casing section separable from said lower section when rotated relative thereto, said lower section having a non-circular recess therein; a valve stem extending from said lower section into said upper section, there being a sliding and non-rotative connection between said stem and said upper section, and said stem having a non-circular portion thereon corresponding in size and shape to the non-circular recess in said lower section; a valve head connected to said stem within said lower section to control the flow of fluid through said valve; and means for moving said valve stem to move the valve head to either open, intermediate or closed position and to move the non-circular portion on said valve stem into the non-circular recess in the lower section when the valve head is moved to either open or closed position, engagement between said non-circular portion on said valve stem and said recess, when said valve head is in either open or closed position, preventing rotation of said upper and lower sections, and non-engagement between said non-circular portion and said recess permitting rotation of said upper and lower sections when the valve head is moved to intermediate position.

15. A valve including a casing composed of a lower casing section and an upper casing section separable from said lower section when rotated relative thereto; a valve stem extending from said lower section into said upper section, said stem having a non-circular portion at its lower end; an interlock between said valve stem and upper section in engagement to prevent rotation of said upper section with respect to said valve stem; a valve head connected to the lower end of said stem to control the flow of fluid through said valve, said valve head having a non-circular recess of a size and shape corresponding to the non-circular portion at the end of the valve stem; a spring mounted within said valve head and bearing against the end of the valve stem to normally maintain the non-circular portion of said stem out of engagement with the recess in the valve head; means for moving said valve stem to selectively move the valve head to and from its closed position; and means for preventing rotation of said valve head within said lower section, movement of said valve stem toward said valve head, as said valve head is moved toward closed position, compressing said spring and effecting engagement between said non-circular portion on the valve stem and said non-circular recess, which engagement locks said upper and lower sections against relative rotation, non-engagement between said non-circular portion and recess permitting relative rotation of said sections.

16. A valve as defined in claim 15 wherein the spring is effective to separate the non-circular portion on the end of the valve stem from the non-circular recess in the valve head as said valve stem is moved from its closed position.

17. A valve including a lower casing section, an intermediate casing section and an upper casing section assembled to constitute a composite valve casing, the sections of which are separable when rotated relative to each other, said lower and intermediate sections having non-circular recesses formed therein; a bonnet extending between said lower and intermediate sections and having a non-circular portion in contact with the non-circular recess in said lower section and having a non-circular opening in registration with the non-circular recess in said intermediate section; a valve stem extending from said lower section through the intermediate section and into the upper section, said valve stem having a non-circular portion thereon corresponding in size and shape to the registering, non-circular recess and opening in the intermediate section and bonnet, respectively; a valve head connected to said stem within said lower section to control the flow of fluid through said valve; means for moving said valve stem to selectively move the valve head to and from its open position; and an interlock between said valve stem and upper section in engagement to prevent rotation of said section relative to said valve stem, the engagement between the non-circular portion on said stem and the non-circular recess and opening in the intermediate section and bonnet, respectively, preventing relative rotation between said lower and intermediate sections and between said upper and intermediate sections when the valve head is in open position, non-engagement between said non-circular portion and said recess and opening permitting relative rotation of said sections.

18. A valve including a lower casing section, an intermediate casing section and an upper casing section assembled to constitute a composite valve casing, the sections of which are separable when rotated relative to each other, said lower and intermediate sections having non-circular recesses formed therein; a bonnet extending between said lower and intermediate sections and having a non-circular portion in contact with the non-circular recess in said lower section and having a non-circular opening in registration with the non-circular recess in said intermediate section; a valve stem extending from said lower section, through the intermediate section and into said upper section, said valve stem having a non-circular portion at its lower end and a second non-circular portion above said first non-circular portion, said second non-circular portion corresponding in shape and size to the registering, non-circular recess and opening in the intermediate section and bonnet, respectively; an interlock between said valve stem and upper section in engagement to prevent rotation of said upper section with respect to said valve stem; a valve head connected to the lower end of said stem to control the flow of fluid through said valve, said valve head being rotatable with respect to said valve stem and having a non-circular recess of a size and shape corresponding to the first non-circular portion on the valve stem; means for preventing rotation of said valve head within said lower casing section; a spring mounted within said valve head and bearing against the end of the valve stem to normally maintain the first non-circular portion of said stem out of engagement with the recess in the valve head; and means for moving said valve stem to selectively move the valve head to open, intermediate or closed position, movement of said valve stem toward said valve head, when said valve head is moved toward closed position, compressing said spring and effecting engagement between said first non-circular portion on the valve stem and said non-circular recess in the valve head, which engagement locks said upper and lower sections against relative rotation, engagement between the second non-circular portion on said valve stem and the non-circular recess and opening in the intermediate section and bonnet, respectively, preventing relative rotation between said lower and intermediate sections and between said upper and intermediate sections when the valve head is in open position, non-engagement between said first non-circular portion and said non-circular recess in the valve head and between the second non-circular portion and the recess and opening in the intermediate section and bonnet, respectively, permitting relative rotation of said sections.

19. A valve including a lower casing section, an intermediate casing section, and an upper casing section all screwed together by means of threads extending in the same direction, said sections constituting a composite valve casing; a sectional valve stem extending from said lower section, through the intermediate section and into the upper section, said valve stem including an upper portion within the upper section of the casing screwed to the remainder of the stem by threads extending in a direction opposite to that of the threads on said sections; a valve head connected to said stem within said lower section to control the flow of fluid through said valve; means for moving said valve stem to selectively move the valve head to open, intermediate or closed position; an interlock between said lower and intermediate sections in engagement to prevent relative rotation thereof; an interlock between the upper portion of the sectional valve stem and the upper section of the casing in engagement to prevent relative rotation thereof; an interlock between the valve head and lower casing section in engagement for preventing rotation of said valve head within said lower section; and interlocks between said valve stem and said intermediate section to prevent relative rotation thereof, said interlocks, when engaged, and said reverse arrangement of threads preventing relative rotation of the upper and intermediate sections when the valve head is in open or closed position, disengagement of said interlocks permitting relative rotation of said upper and intermediate sections when the valve is in intermediate position.

JOSEPH E. WALL.